(12) United States Patent
Tyson

(10) Patent No.: US 6,552,500 B1
(45) Date of Patent: Apr. 22, 2003

(54) ELECTRIC LIGHTS

(75) Inventor: Lawrence Samuel Tyson, Sutton (GB)

(73) Assignee: Microlights Limited, Wilshire (GB)

( * ) Notice: Subject to any disclaimer, the term of this patent is extended or adjusted under 35 U.S.C. 154(b) by 433 days.

(21) Appl. No.: 10/048,189

(22) PCT Filed: Jul. 26, 2000

(86) PCT No.: PCT/GB00/02875
§ 371 (c)(1),
(2), (4) Date: Jan. 25, 2002

(87) PCT Pub. No.: WO01/08454
PCT Pub. Date: Feb. 1, 2001

(30) Foreign Application Priority Data

| Jul. 26, 1999 | (GB) | 9917530 |
| Jul. 26, 1999 | (GB) | 9917532 |
| Nov. 18, 1999 | (GB) | 9927344 |

(51) Int. Cl.$^7$ .................. H05B 37/02; H05B 37/00
(52) U.S. Cl. .................. 315/291; 315/244; 315/224
(58) Field of Search .................. 315/291, 307, 315/244, 219, 200 R, 308, 209 R, 224, 247, 225, DIG. 5, DIG. 7

(56) References Cited

U.S. PATENT DOCUMENTS

| 5,448,137 A | * | 9/1995 | Bobel ............ 315/244 |
| 5,677,602 A | * | 10/1997 | Paul et al. ....... 315/224 |
| 6,150,768 A | * | 11/2000 | Nilssen .......... 315/209 R |

\* cited by examiner

Primary Examiner—Honganh Le
Assistant Examiner—Chuc D. Tran
(74) Attorney, Agent, or Firm—Merchant & Gould, P.C.

(57) ABSTRACT

An electronic control (1) for a discharge lamp (D), which is arranged to be connected to a source of alternating current (L,N), having a source frequency, the control having a first and second terminal (J,K) for supplying an electrical power output to operate the lamp; a capacitor (T) is in series with the first terminal, having a capacitance sufficiently small to limit a current flow from the first terminal at the source frequency of less than 30 mA.

22 Claims, 6 Drawing Sheets ns
ELECTRIC LIGHTS

BACKGROUND OF THE INVENTION

The present invention relates to controls for discharge lighting.

Discharge lamps have a high impedance before they are lit, and a low impedance when they are lit. A disadvantage of these lamps is that additional components are required for their proper operation. In particular a means of limiting or controlling the current drawn by the lamp is required, together with a means of starting an arc discharge in the lamp.

The arrangements of components associated with the control of lamp current are commonly referred to as a "ballast", whilst those components performing the function of starting the lamp are collectively referred to as the "ignitor".

Traditionally the ballast function was performed by a large and heavy inductor operating at the power line or source frequency, whilst the ignitor function was performed by the generation of high (2–5 kV) voltage pulses superimposed onto supply terminals of the lamp.

Electronic control means may be used to overcome the above mentioned disadvantages, but as a result of their complexity, new disadvantages of cost and reliability have prevented their widespread use. Electronic controls frequently operate at a high frequency, much higher than the power source frequency. However, a problem exists with known designs of electronic controls in that source frequency power is present at lamp terminals provided for connection of a discharge lamp. The presence of source frequency power at lamp terminals presents a potentially fatal electrical shock hazard when changing lamps. There is a particular risk when a lamp fails by fracturing of a protective glass envelope containing light emitting elements and exposed electrical conductors. To reduce the risk it is known to fit a safety switch on a luminaire, such that when the luminaire is opened to gain access to the lamp, the safety switch ensures that power to the lamp is disconnected.

A problem with known designs of electronic controls is that un-necessary stress is caused to the electronic control and other components of the luminaire during the normal starting procedure or when a bulb fails or is absent from the luminaire. A primary cause of this stress arises from inappropriate operation of the control as a consequence of uncertainty as to whether the lamp is lit or not.

British patent GB 2,177,309 (Erbe Elecktromedizin) discloses a surgical instrument requiring a low power output, comprising a high frequency power source for powering a tool with high frequency and having two capacitors in series with the tool. The capacitors have values such that their impedance is small for the high frequency current of the power source and high for possible low frequency leakage currents flowing to ground arising from contact by a patient with some other defective electrical appliance. The capacitors do not provide the desired level of protection, hence a safety circuit is arranged to trip a safety switch, when the low frequency leakage current exceeds an adjustable limiting value, so as to disconnect the high frequency power source from ground. Disconnection of the power supply from ground does not prevent hazards from any other inadvertent contact between the patient and ground. The publication describes a power supply for a surgical instrument that would not be suitable for use with a discharge lamp which has to provide high ignition voltage and lower operating voltages across a lamp.

U.S. Pat. No. 5,625,258 (Preis Karl-Heinrich, assigned to Bosch) discloses a power supply having a low frequency output, with a frequency of several hundred hertz, for powering a discharge lamp. This publication states that "switching off of the power supply such that the maximum voltage which occurs is reduced at all possible contact points to values which do not present a hazard is essential." Hence, to ensure safe operation a fault current detection means is provided to emit a switch off signal to inhibit the operation of a high frequency voltage converter when a fault current having a DC or low frequency at that of an inverter 6 is detected above a pre-set threshold. This publication is not relevant to the use of a high frequency output for powering a discharge lamp, or the use of a capacitor in series with an output terminal of a power supply for a discharge lamp to provide a supply where a fault current cannot exceed a safe level. A disadvantage of the power supply described in this publication is that the lamp is extinguished when a fault current is detected. A further disadvantage is that a person inadvertently touching a live part is subject to a potentially dangerous low frequency voltage.

British patent GB 2,229,873 (Koito Manufacturing Co) discloses a lighting circuit providing an alternating current output for powering a metal halide lamp, having a detection means arranged to detect the alternating current flowing through the lamp once the lamp has ignited. The detection means is either by means of a current transformer, which has disadvantages of cost, or by means of a series capacitor, which to provide a suitably low output voltage across it for the purposes of detection must necessarily have a large value of capacitance. A disadvantage of the lighting circuit disclosed in this publication is that the circuit would not provide safety to a person inadvertently touching an output terminal for supplying power to the lamp.

U.S. Pat. No. 5,965,986 (Bosch) discloses an arrangement for detecting the ignition of a high pressure gas discharge lamp by detecting a sudden decrease in the high voltage applied across a lamp to effect ignition. A disadvantage of this arrangement is that it can only detect the initial ignition of a lamp, and cannot detect a lamp that has initially ignited, but then extinguished. The circuit disclosed in this publication would be unsuitable for use with a power supply that produces a resonant high frequency alternating current voltage for igniting a lamp.

SUMMARY OF THE INVENTION

According to the present invention there is provided a control and a discharge lamp, the control arranged for connection to a source of alternating current electrical power at a source frequency, the source frequency being a low frequency, the control having a first and a second terminal for supplying an output of electrical power to operate the discharge lamp, the output power being at a high frequency, and a first capacitor being connected in series with the lamp to the first terminal, the first capacitor having a value of capacitance, characterised in that the value of capacitance is sufficiently small to limit a current flow from the first terminal at the source frequency to less than 30 mA, and wherein a second capacitor is connected in series with the lamp to the second terminal, the second capacitor having a value of capacitance, the value of capacitance being sufficiently small to limit a current flow from the second terminal at the source frequency to less than 30 mA.

A benefit of placing a suitably small capacitor in series with a lamp terminal, is that the maximum current flow at the source frequency from that terminal is limited to a value of 30 mA which is accepted as being a maximum safe current that is unlikely to present a fatal shock hazard to the large majority of persons. Hence a person who accidentally makes contact with both terminals is most unlikely to suffer fatal injuries from this maximum safe current of 30 mA. A further benefit is that the cost and complexity of a luminaire may be reduced by the elimination of a safety switch that disconnects the electrical power to the terminals within the luminaire when an openable cover is opened to gain access for the purposes of changing a lamp. Such a safety switch is relatively expensive, as it has to be of an approved type and care has to be taken in the design of its mounting to minimise the risk of a user disabling the switch. Such a safety switch, however, can provide no protection in the event that a glass window in the openable cover is broken, allowing access to the lamp which may have been damaged by an explosive failure of the enclosed lamp thereby exposing live electrical conductors that form part of the lamp.

A benefit of having a second capacitor is that a person who accidentally makes contact with one terminal and an electrical earth will be most unlikely to suffer fatal injuries from this maximum safe current 30 mA, and further this protection is irrespective of which terminal is touched or which terminal is electrically connected to a live or a neutral pole of the source.

The current flow at the source frequency may be more preferably limited to less than 5 mA or even more preferably the current flow at the source frequency is limited to less than 1 mA. A benefit of further limiting the current flow is that a potential hazard is further reduced, so that a small percentage of the population that may suffer a fatal injury from accidental electrical contact with the lamp terminals is considered to be an acceptable risk, such that such a control for a discharge lamp may be considered to provide safety isolation of the lamp terminals from the source supply. A further benefit is that it may be possible to omit an earth connection to such a lampholder, saving costs and complexity.

Preferably the output of electrical power is an alternating current supply of a frequency greater than 100 kHz, and more preferably the frequency is greater than 200 kHz. A benefit of such a high output frequency is that a capacitor with a sufficiently small value of capacitance to limit the current flow at the supply frequency to a safe value will conduct sufficient energy at a high output frequency to operate a discharge lamp with usefully high light output.

A further benefit of a high output frequency is that conduction at such frequencies is concentrated in the surface layers of a conductor, hence a person touching lamp terminals having an ability to supply sufficient energy at the high frequency will not suffer fatal injury, any injury from the high frequency output being limited to localised skin burns at the point of contact with the terminals.

Preferably the output of electrical power is an alternating current with a sinusoidal wave form. A benefit of using a sinusoidal wave form is that the capacitors may be of a smaller physical size, and hence cheaper, than would be necessary if a conventional square wave output were used. A sine wave voltage output produces a sine wave current output and avoids the distorted current wave form arising from the harmonics generated as a result of a conventional square wave form voltage output.

Preferably the control is arranged to apply a DC voltage to the first lamp terminal for connection to the lamp, and the control further comprising a sensor to detect the conduction of the DC voltage by the lamp, the sensor being arranged to provide a feedback signal to the control when the conduction of the DC voltage is detected.

By DC it is in the above paragraph and hereinafter meant a current having a predominant DC element, examples of which will be shown in the accompanying drawings.

A benefit of this is that when a control has attempted to start a lamp, it is possible to detect that the lamp is lit while it is in a glow mode of operation, and before an arc has been established. A further benefit is that the control may be arranged to alter an output power to the lamp according to the feedback from the sensor.

Preferably the sensor detects the conduction of the DC voltage by the lamp, by detecting a DC voltage level across a capacitor connected to the second lamp terminal.

A benefit of detecting the voltage level across a capacitor is that a high degree of immunity from interference from electrical noise may be obtained.

Preferably the sensor is connected in series with the lamp to detect the current arising from the conduction of the DC voltage by the lamp.

A benefit of detecting the current arising from the conduction of the DC voltage by the lamp is that the sensor may be connected to either the first or the second lamp terminal.

Preferably the sensor is connected to the second lamp terminal.

Preferably the discharge lamp is a high intensity discharge lamp.

Preferably the sensor detects the conduction of the DC voltage by the lamp before an arc is established in the lamp.

Preferably the control is arranged to provide an alternating current output to power the lamp with an output frequency above 400 kHz. More preferably the alternating current (A.C.) output has an output frequency above 500 kHz.

A benefit of a high output frequency is that the capacitor connected to the second lamp terminal may be of a small value of capacitance, and hence a time taken for the capacitor to become charged with the DC voltage level across the capacitor is reduced.

Preferably the control is further arranged to apply a direct current voltage to the first terminal, the direct current voltage being supplied through a resistor connected in parallel with the first capacitor, the control further comprising a sensor to detect the conduction of the direct current voltage by the lamp, the sensor being arranged to provide a feedback signal to the control when the direct current voltage is detected.

A benefit of this is that when a control has attempted to start a lamp, it is possible to detect that the lamp is lit while it is in a glow mode of operation, and before an arc has been established, and the capacitor in series with the lamp limits the amount of DC current that the lamp is subject to, hence avoiding damage to the lamp arising from the conduction of a large DC current. A further benefit is that the control may be arranged to alter an output power to the lamp according to the feedback from the sensor.

Preferably the discharge lamp is a high intensity discharge lamp. Such lamps have a high impedance before they are lit, and a low impedance while they are lit. High intensity discharge lamps are characterised by a short arc length, typically less than 5 mm for a 20 watt lamp, and have a sealed envelope containing at least two electrodes for an electrical discharge, and typically have a high internal pressure when hot.

BRIEF DESCRIPTION OF THE DRAWINGS

Specific embodiments of the invention will now be described by way of example with reference to the accompanying drawings in which.

DESCRIPTION OF PREFERRED EMBODIMENTS

Figure 1:
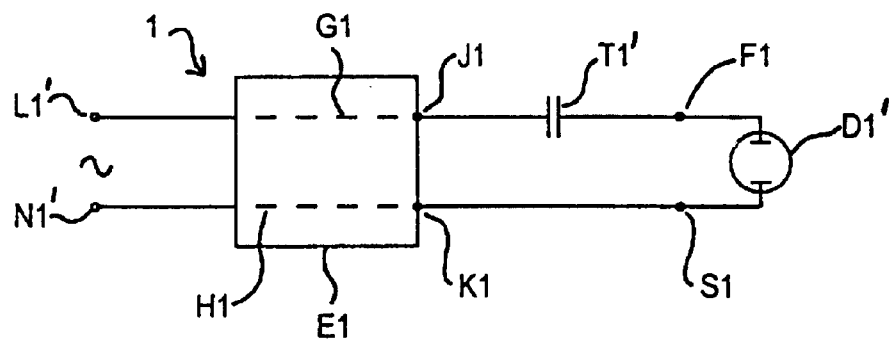
FIG. 1 is a circuit diagram of a control for a discharge lamp according to the present invention.

From FIG. 1, a control 1 for a discharge lamp comprises connections L1' and N1' for connecting to an alternating current source, and a first terminal F1 and a second terminal S1 for connection to a discharge lamp D1'. The control 1 also comprises an electronic circuit E1 which is arranged to control the output power to the terminals F1 and S1 for the discharge lamp D1'. The electronic circuit E1 may also provide high voltage pulses required to start the discharge lamp D1'. Internal connections G1 and H1 within the electronic circuit E1 provide an electrical connection between the alternating current source connections L1' and N1' such that electrical power at the source frequency is present across an output J1 and K1 of the electronic circuit. A capacitor T1' is connected in series with the first terminal F1, so that all the electrical power to the first terminal F1 passes through the capacitor T1'. The capacitor T1' is sufficiently small to limit a current flow from the first terminal at the source frequency to less than safe maximum value, such that the maximum electrical power at the source frequency available form the terminal F1 is unlikely to present a fatal shock hazard to the large majority of persons. Such a safe value is widely accepted as being a current of 30 mA, as this is unlikely to cause heart fibrillation in the majority of persons. However, it may be preferable to meet more stringent standards requirements to reduce the current further. To enable sufficient electrical power to be supplied to the output terminals F1 and S1 to both start and operate a discharge lamp, which typically range from power ratings of 75 watts to 150 watts in popular ratings and above for special applications, the electrical circuit E1 is preferably arranged to provide the output electrical power at a high frequency.

Figure 2:
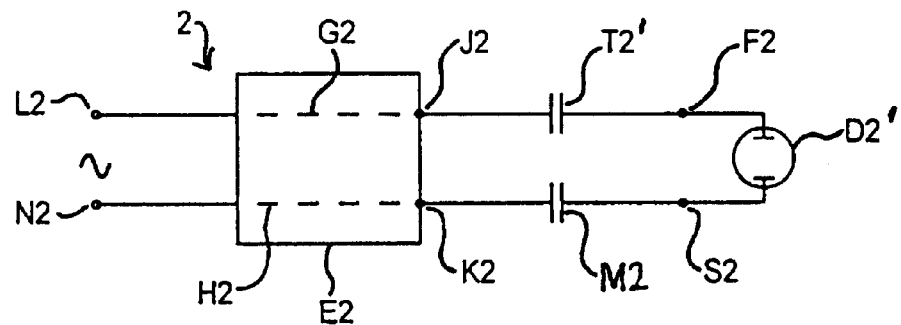
FIG. 2 is an alternative embodiment of a control for a discharge lamp according to the present invention.

From FIG. 2, a control 2 for a discharge lamp that is similar to the control 1 shown in FIG. 1 is shown. Control 2 comprises connections L2 and N2 for connecting to an alternating current source, and a first terminal F2 and a second terminal S2 for connection to a discharge lamp D2'. The control 2 also comprises an electronic circuit E2 which is arranged to control the output power to the terminals F2 and S2 for the discharge lamp D2'. Internal connections G2 and H2 within the electronic circuit E2 provide an electrical connection between the alternating current source connections L2 and N2 such that electrical power at the source frequency is present across an output J2 and K2 of the electronic circuit. A capacitor T2' is connected in series with the first terminal F2, so that all the electrical power to the first terminal F2 passes through the capacitor T2'. A second capacitor M2 is connected in series with the second terminal S2, so that all the electrical power to the second terminal S2 passes through the second capacitor M2. The capacitor T2' and the second capacitor M2 are each sufficiently small to limit a current flow from the first terminal F2 and the second terminal S2 respectively, at the source frequency to less than safe maximum value, such that the maximum electrical power at the source frequency available from the terminal F2 or from the terminal S2 is unlikely to present a fatal shock hazard to the large majority of persons. In operation the circuit shown in FIG. 2 is the same as that shown in FIG. 1, and has the same benefits, with the additional protection afforded by the second capacitor M2. The effect of the additional protection is that while control 1 would provide protection against shock between terminals F1 and S1, or between F1 and earth, control 1 does not provide Protection in the event that the neutral supply has a dangerous voltage present, which could result from an unbalanced 3 phase load. Control 2, however, with the second capacitor M2 does provide protection in the event that there is a dangerous potential between the neutral N2 and hence second terminal S2 and earth.

Figure 3:
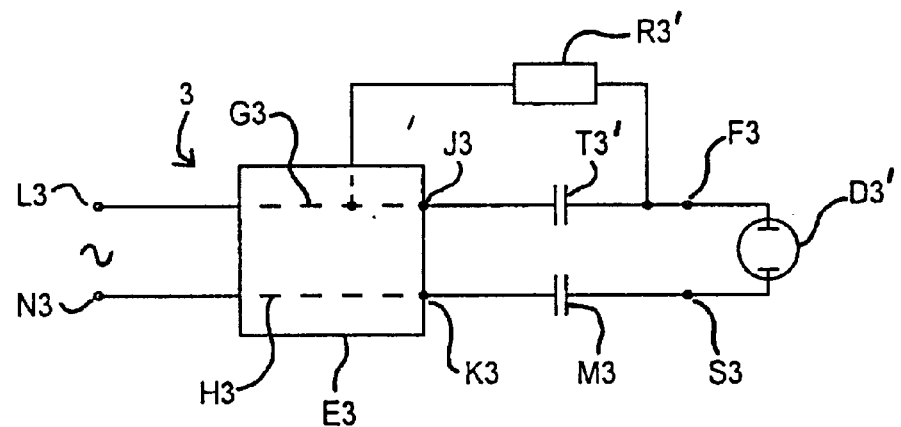
FIG. 3 is a further embodiment of a control for a discharge lamp according to the present invention.

From FIG. 3, a third control 3 may be seen, that is similar to the control shown in FIG. 2. Control 3 comprises connections L3 and N3 for connecting to an alternating current source, and a first terminal F3 and a second terminal S3 for connection to a discharge lamp D3'. The control 3 also comprises an electronic circuit E3 which is arranged to control the output power to the terminals F3 and S3 for the discharge lamp D3'. Internal connections G3 and H3 within the electronic circuit E3 provide an electrical connection between the alternating current source connections L3 and N3 such that electrical power at the source frequency is present across an output J3 and K3 of the electronic circuit. A capacitor T3' is connected in series with the first terminal F3, so that the electrical power to the first terminal F3 passes through the capacitor T3'. Connected in parallel with the capacitor T3' is an additional impedance R3'. Being in parallel with T3', the additional impedance R3' will conduct electrical power to the first terminal F1. The additional impedance R3' is preferably resistive. Preferably the impedance measured at the supply frequency of the additional impedance R3' is greater than the impedance of the capacitor T3' at the supply frequency. More preferably the impedance measured at the supply frequency of the additional impedance R3' is 100 times greater than the impedance of the capacitor T3' at the supply frequency of 50 Hz. A second capacitor M3 is connected in series with the second terminal S3, so that all the electrical power to the second terminal S3 passes through the second capacitor M3. The combined impedance of the additional impedance R3' and capacitor T3' is sufficiently small to limit a current flow from the first terminal F3 at the source frequency to less than a safe maximum value. Likewise the second capacitor M3 is sufficiently small to limit a current flow from the second terminal S3, at the source frequency to less than safe maximum value, such that the maximum electrical power at the source frequency available from the terminal F3 or from the terminal S3 is unlikely to present a fatal shock hazard to the large majority of persons. In operation the circuit shown in FIG. 3 is the same as that shown in FIG. 2 with an additional benefit of having an additional impedance R3'. A benefit of additional impedance R3' is that the electronic circuit E3 may be arranged to monitor a voltage across the additional impedance R3'.

In an embodiment of the invention, it has been found that a electronic circuit producing an output at a frequency of 500 kHz, fitted with a 22 nF capacitor in series with each lamp terminal will satisfactorily operate a 70 W high intensity discharge lamp, and at the supply frequency of 50 Hz the maximum current that may be drawn from either lamp terminal to earth is limited to 1.6 mA. In this embodiment both lamp terminals are connected to the live supply and hence the maximum current between the two terminals is less than 1.6 mA, and the maximum current that can be drawn between both terminals when they are shorted together and earth is more than 1.6 mA, but less than 3 mA. In order to ensure safety, the capacitors are suitably rated to provide operation that is free from failure of the capacitor to a short circuit condition. Suitable such capacitors would be those that are Class Y rated.

To enable operation of discharge lamps with larger power ratings, it would be preferable to further increase the high frequency of the output power to ensure that the safety of the luminaire is maintained.

Electronic ballasts for high intensity discharge lamps comprising electronic circuits and provided with at least a capacitor in series connection with a lamp terminal are known. Such capacitors are provided with other components as a means of regulating lamp current to a required value to obtain a desired power output from a lamp connected across the lamp terminals. Known electronic ballasts typically operate with an output frequency of about 40 kHz. Hence such capacitors are necessarily large to enable the electronic circuit to supply adequate power to the lamp. These known circuits with capacitors having large values of capacitance do not limit the supply currents to sufficiently low values to prevent the risk of electrocution from accidental contact with the lamp terminals while the ballast is connected to the supply.

Figure 4:
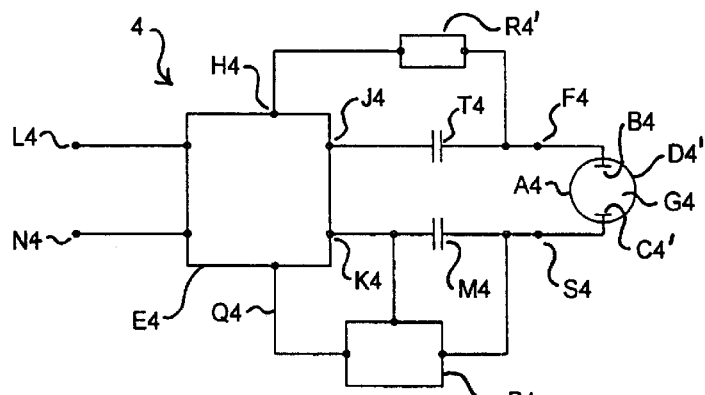
FIG. 4 is a circuit diagram of a fourth embodiment of a control for a discharge lamp according to the present invention.

From FIG. 4, a control 4 for a discharge lamp comprises connections L4 and N4 for connecting to an alternating current source, which is alternating at a supply frequency, and a first terminal F4 and a second terminal S4 for connection to a discharge lamp D4'. The discharge lamp D4' comprises an envelope A4 enclosing two electrodes B4 and C4', and a lamp fill G4. The control 4 also comprises an electronic circuit E4 which is arranged to control the output power to the terminals F4 and S4 for the discharge lamp D4'. The output power has a output frequency that is higher than the supply frequency. A capacitor T4 is connected in series with the first terminal F4 and a second capacitor M4 is connected in series with the second terminal S4. The capacitor T4 prevents the flow of a direct current from a first output terminal J4 to the first terminal F4, and second capacitor M4 similarly prevents the flow of direct current from a second output terminal K4 to the second terminal S4. An impedance R4' is connected to a direct current voltage output H4 of the electronic circuit E4 and in parallel with the capacitor T4 to terminal F4. Preferably the impedance R4' is resistive or has a resistive component. More preferably the impedance R4' has a high value of impedance at the output frequency, when compared with the capacitor T4. A sensor P4 is connected in parallel with the second capacitor M4, and has a feedback output to the electronic circuit at Q4. The sensor P4 detects a direct current voltage across capacitor M4.

Figure 5:
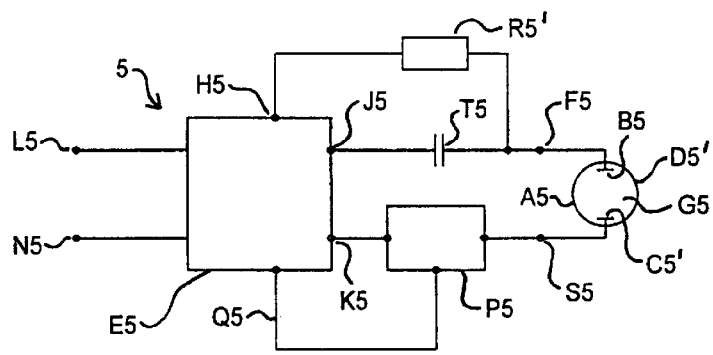
FIG. 5 is a circuit diagram of a fifth embodiment of a control for a discharge lamp according to the present invention.

In a fifth embodiment shown in FIG. 5, a control 5 for a discharge lamp comprises connections L5 and N5 for connecting to an alternating current source, which is alternating at a supply frequency, and a first terminal F5 and a second terminal S5 for connection to a discharge lamp D5'. The discharge lamp D5' comprises an envelope A5 enclosing two electrodes B5 and C5', and a lamp fill G5. The control 5 also comprises an electronic circuit E5 which is arranged to control the output power to the terminals F5 and S5 for the discharge lamp D5'. The output power has a output frequency that is higher than the supply frequency. A capacitor T5 is connected in series with the first terminal F5. The capacitor T5 prevents the flow of a direct current from a first output terminal J5 to the first terminal F5. An impedance R5' is connected to a direct current voltage output H5 of the electronic circuit E5 and in parallel with the capacitor T5 to terminal F5. Preferably the impedance R5' is resistive or has a resistive component. More preferably the resistance R5' has a high impedance at the output frequency, when compared with the capacitor T5. A sensor P5 is connected in a series connection between a second output terminal K5 and the second terminal S5, and hence in series with the lamp D5'. The sensor P5 is arranged to detect a DC current flowing through the lamp D5'. The sensor has a feedback output Q5 connected to the electronic circuit E5.

In a sixth embodiment of the invention, with the same circuit diagram as shown in FIG. 4 as already described above, except that the supply frequency is higher than 400 kHz. In this embodiment the capacitor T4 and the second capacitor M4 are preferably made as small as possible to limit the amount of current they pass at the supply frequency. More preferably the capacitors T4 and M4 and the impedance R4' are such that a risk of failure to a short circuit condition is minimised.

In operation, before the lamp is lit it has a very high impedance, and is effectively open circuit. When the supply across L4 and N4 is switched on, the electronic circuit E4 attempts to start the lamp D4' by generating a very high voltage pulse across the output terminals F4 and S4. The intention is that the very high voltage pulse should cause the lamp to begin to conduct in an initial conduction mode. The initial conduction mode is normally one where the lamp conducts in a glow mode, where the lamp fill G4 is ionised and the ions conduct electricity, the conduction of the electricity causing the lamp to increase in temperature, and for the fill to become more conductive, until a second conduction mode is established when the electrical discharge through the lamp forms an arc between the electrodes B4 and C4'.

The electronic circuit E4 produces a direct current voltage output at H4, which is conducted by the impedance R4' so that the direct current voltage output is present at first terminal F4. Before the lamp is lit, the lamp is open circuit, and hence the direct current voltage is not present at the second terminal S4. However, immediately the lamp is ionised, the lamp is able to conduct the direct current, and the capacitor M4 is charged so that a direct current voltage arises across it. The sensor P4 is arranged to sense the direct current voltage across the capacitor M4. The sensor P4 is arranged to provide a feedback signal on the feedback output Q4 to the electronic circuit E4 as soon as the sensor has detected a direct current voltage across the capacitor M4. A benefit of this is that the lit state of the lamp may be reliably detected while the lamp is in the glow mode of operation, and before the lamp has reached the stage where an arc is established across the electrodes B4 and C4'.

Preferably the capacitor M4 has a small capacitance value. Preferably the value of capacitance of the capacitor M4 is less than 100 nano farads, and more preferably the value of capacitance is less than 30 nano farads. A benefit of this is that the time taken to charge the capacitor is short. A further benefit of the small value of capacitance is that a DC component of current that would frequently be present and would otherwise be difficult to control is minimised and hence wear or erosion of lamp electrodes (e.g. B4 and C4') which is caused by the DC component of current may also be minimised.

A further benefit of the small value of capacitance is that the current required to charge the capacitance in a given time is correspondingly small, permitting the use of high values of impedance for impedance R4', hence reducing the risk of electric shock at the lamp terminals F4 & S4 from the DC component of current.

Preferably the sensor P4 is arranged to sense the direct current voltage when it is at a low level. Preferably this low level is 50% of the voltage of the direct current voltage at H4. More preferably the low level is 10% of the voltage of the direct current voltage at H4. A benefit of the low level is that the time taken to establish that the lamp is lit is further reduced.

A benefit of using a direct current voltage to determine when the lamp has started to conduct and is lit, is that it is possible to detect the presence of the direct current or the voltage despite the much larger high frequency currents that the lamp is also conducting. A further benefit is that it is possible to make a detection circuit that reliably detects the presence of the direct current voltage, and has a high degree of immunity to electrical noise.

The fifth embodiment shown in FIG. 5, where there is only a capacitor T5 in parallel with the impedance R5', operates in exactly the same way as the fourth embodiment shown and described with reference to FIG. 4, except that the sensor P5 is arranged to sense the presence of direct current flowing between terminal S5 and output terminal K5. This embodiment provides similar fast detection of the lit state of the lamp.

Figure 6:
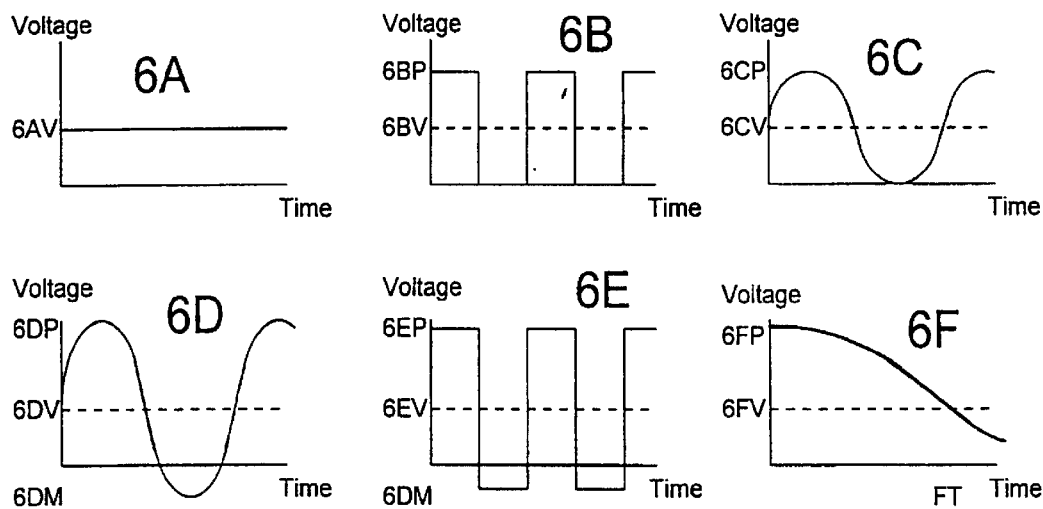
FIG. 6 is a diagrammatic representation of suitable wave forms for a DC voltage supply that is referred to in the description of the embodiments of FIGS. 4 and 5.

The direct current voltage output at H4 or H5 may have a smoothed wave form, or may have a square wave form or a sinusoidal waveform, provided that the voltage wave form has a direct current voltage offset with respect to a voltage potential at the second output terminal K4 or K5. The direct current may have a voltage that changes with time. FIG. 6 shows by way of example suitable wave forms for the direct current voltage output at H4 or H5. In FIG. 6 is shown at 6A a smooth DC voltage with a value of 6AV volts, and at 6B a square wave form with an average DC voltage of 6BV and a peak voltage of 6BP, and at 6C a sinusoidal wave form with an average DC voltage of 6CV and a peak voltage value of 6CP, and at 6D a second sinusoidal wave form with an average DC voltage of 6DV and a peak positive voltage value of 6DP and a negative peak value of 6DM, and at 6E a second square wave form with an average DC voltage of 6EV and a positive peak voltage of 6EP and a negative peak value of 6EM, and at 6F a non-linear wave form with a peak value of 6FP and a decaying voltage value which reaches a value of 6FV after a time of FT has elapsed, where elapsed time FT is preferably greater than a time taken by a typical lamp to become fully lit.

The average DC voltage referred to in FIG. 6 is direct current voltage offset, that is such that the wave forms shown in FIG. 6 have a predominant DC element. Preferably a value of the DC voltage offset is such that a sensor such as the sensor P4 or P5 described above with reference to FIGS. 4 and 5 may reliably detect conduction of the DC voltage by a lamp when it becomes lit, and in the case of a high intensity discharge lamp before an arc is established within the lamp.

A problem arises where the lamp does not begin to conduct after a first very high voltage pulse, and it is necessary to repeat the application of a very high voltage pulse across the terminals F4 and S4 until the lamp does begin to conduct. However, it is undesirable to repeat the application of very high voltage pulses across the terminals once the lamp has begun to conduct since they serve no useful purpose and have the adverse effect of placing high stresses on dielectric components in the output circuit. Feedback from the sensor may be used to overcome these problems.

It is possible that a lamp that has begun to conduct in a glow mode, will fail to stabilise and the lamp will cease to conduct before the arc mode of conduction is reached. It is a benefit of this invention that the sensor will be able to detect immediately such a cessation of conduction occurs, and the electronic circuit E4 may be arranged to take appropriate action. Such appropriate action could include attempting to restart conduction by the immediate application of a further very high voltage pulse, or if the lamp has conducted for a period of time such that it may be hot, the electronic circuit may be arranged to wait for a period of time to allow the lamp to cool before attempting to restart conduction by the application of a further very high voltage pulse.

A seventh embodiment 901 of the invention will now be described in detail with reference to the circuit diagram given as FIG. 10, and the following Table 1 which gives suitable values for the components shown in FIG. 10 for a particular example of the seventh embodiment arranged to power a 70 W high intensity discharge lamp LP1, such as a Philips MASTERCOLOUR CDM-T (Registered Trademark) or a GE ARCSTREAM (Registered Trademark).

Figure 9:
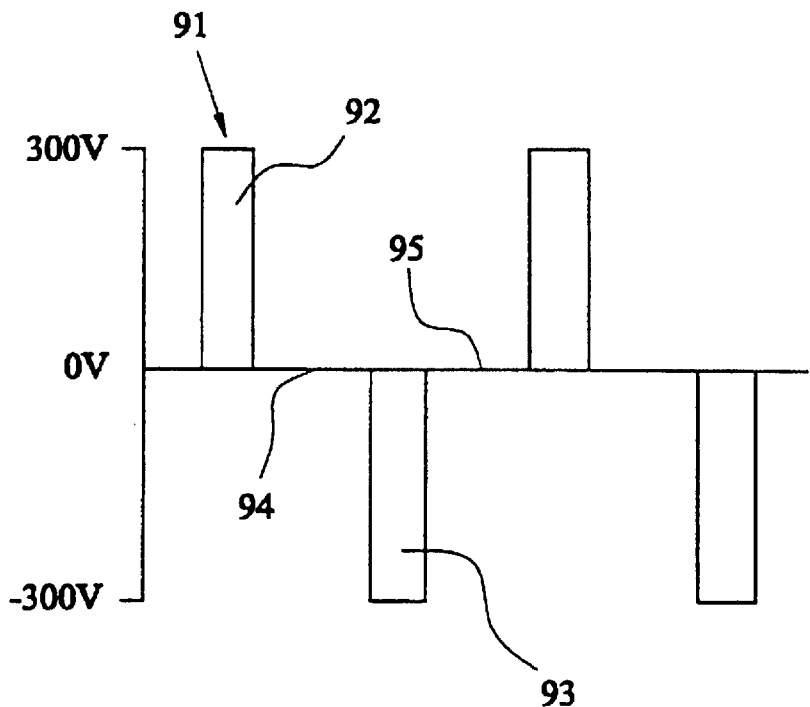
FIG. 9 is a graph of a driving waveform for the output transistors for the embodiment shown in FIG. 10 at a higher frequency.

To improve clarity, FIG. 9 has been drawn on two pages, and it may be seen that the two portions of the circuit are connected at the points "a" through to "h".

TABLE 1

| Symbol | Value/Reference |
| --- | --- |
| D1 | BAS216 |
| D2 | BAS216 |
| D3 | BAS216 |
| D4 | BAS216 |
| D5 | RB160L-40 |
| D6 | RB160L-40 |
| D7 | RB160L-40 |
| D8 | BAS216 |
| D9 | RB160L-40 |
| D10 | RB160L-40 |
| D11 | RB160L-40 |
| D12 | RB160L-40 |
| D13 | BAS216 |
| D14 | BAS216 |
| D15 | UF5404 |
| D16 | UF5404 |
| D17 | UF5408 |
| D18 | UF5408 |
| D19 | UF4006 |
| D20 | UF4006 |
| D21 | BAS216 |

TABLE 1-continued

Symbol Value/Reference

| Symbol | Value/Reference |
|---|---|
| D22 | BAS216 |
| D23 | 15 V ZENER |
| BR1 | 4A 600 V BRIDGE RECTIFIER |
| Q1 | BC849 |
| Q2 | BC849 |
| Q3 | FMMT720 |
| Q4 | FMMT720 |
| Q5 | IRML2803 |
| Q6 | IRF840 |
| Q7 | IRF840 |
| U1 | UC3861N |
| T1 | 10:1 AUX POWER TRANSFORMER |
| T2 | 36:1 CURRENT TRANSFORMER |
| T3 | 7:11 GATE DRIVE TRANSFORMER |
| L | 76 MICROHENRY OUTPUT INDUCTOR |
| L1 | 20 MH COMMON MODE INDUCTOR |
| R1 | 10 k$\Omega$ |
| R2 | 10 k$\Omega$ |
| R3 | 10 k$\Omega$ |
| R4 | 18 k$\Omega$ |
| R5 | 100 k$\Omega$ |
| R6 | 100 k$\Omega$ |
| R7 | 3.9 k$\Omega$ |
| R8 | 22 k$\Omega$ |
| R9 | 22 k$\Omega$ |
| R10 | 1 M$\Omega$ |
| R11 | 1 M$\Omega$ |
| R12 | 18 k$\Omega$ |
| R13 | 15 k$\Omega$ |
| R14 | 10 k$\Omega$ |
| R15 | 15 $\Omega$ |
| R16 | 15 $\Omega$ |
| R17 | 47 $\Omega$ |
| R18 | 47 $\Omega$ |
| R19 | 47 $\Omega$ |
| R20 | 827 k$\Omega$ |
| R21 | 1 M$\Omega$ |
| R22 | 180 k$\Omega$ |
| R101 | 1 M$\Omega$ |
| R102 | 1 M$\Omega$ |
| R103 | 47 k$\Omega$ |
| SR1 | 20 $\Omega$ NTC |
| C1 | 10 nF |
| C2 | 10 nF |
| C3 | 100 nF |
| C4 | 100 nF |
| C5 | 12 pF |
| C6 | 100 nF |
| C7 | 10 nF |
| C8 | 220 pF |
| C9 | 100 nF |
| C10 | 100 nF |
| C11 | 100 nF |
| C12 | 100 nF |
| C13 | 100 nF |
| C14 | 3.3 $\mu$F |
| C15 | 470 pF/1 kV |
| C16 | 470 pF/1 kV |
| C19 | 220 pF |
| C20 | 220 $\mu$F/200 V |
| C21 | 220 $\mu$F/200 V |
| C22 | 220 nF/250 VAC |
| C23 | 220 nF/250 VAC |
| C24 | 470 $\mu$F/25 V |
| C | 22 nF/1 kV |
| C101 | 22 nF/1 kV |
| C102 | 100 nF/25 V |
| CIGN | 1.5 nF/6 kV |

Figure 10:
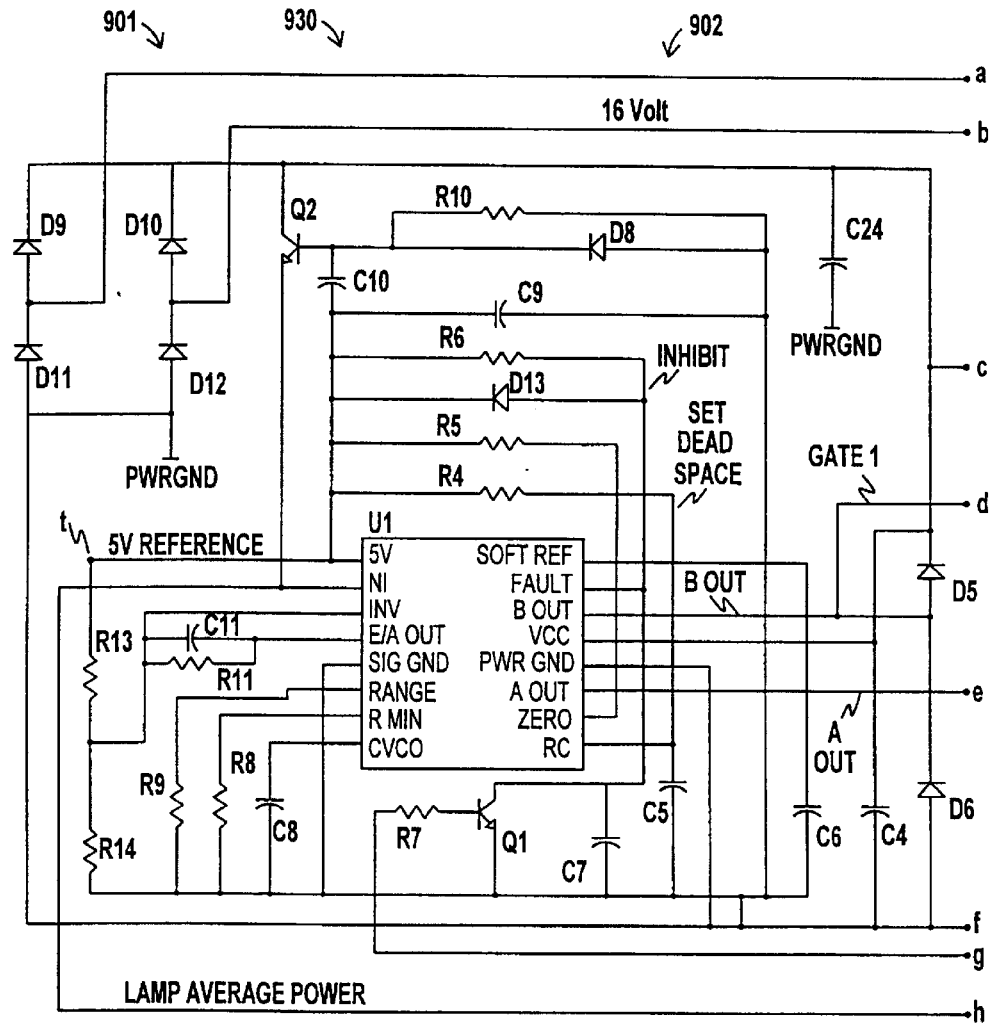
FIG. 10 is a circuit diagram of an electronic ballast according to a seventh embodiment of the invention.
Figure 10:
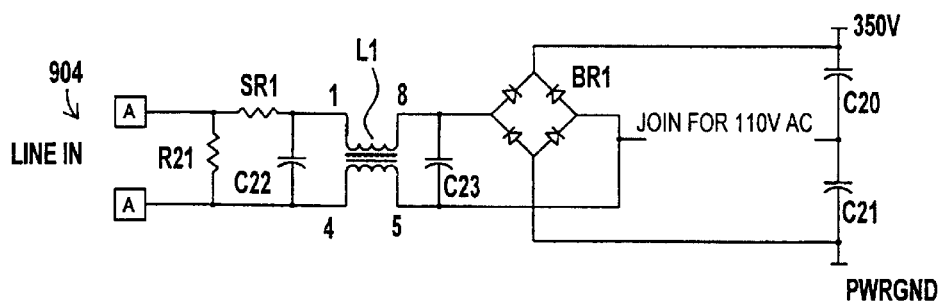
Figure 10:
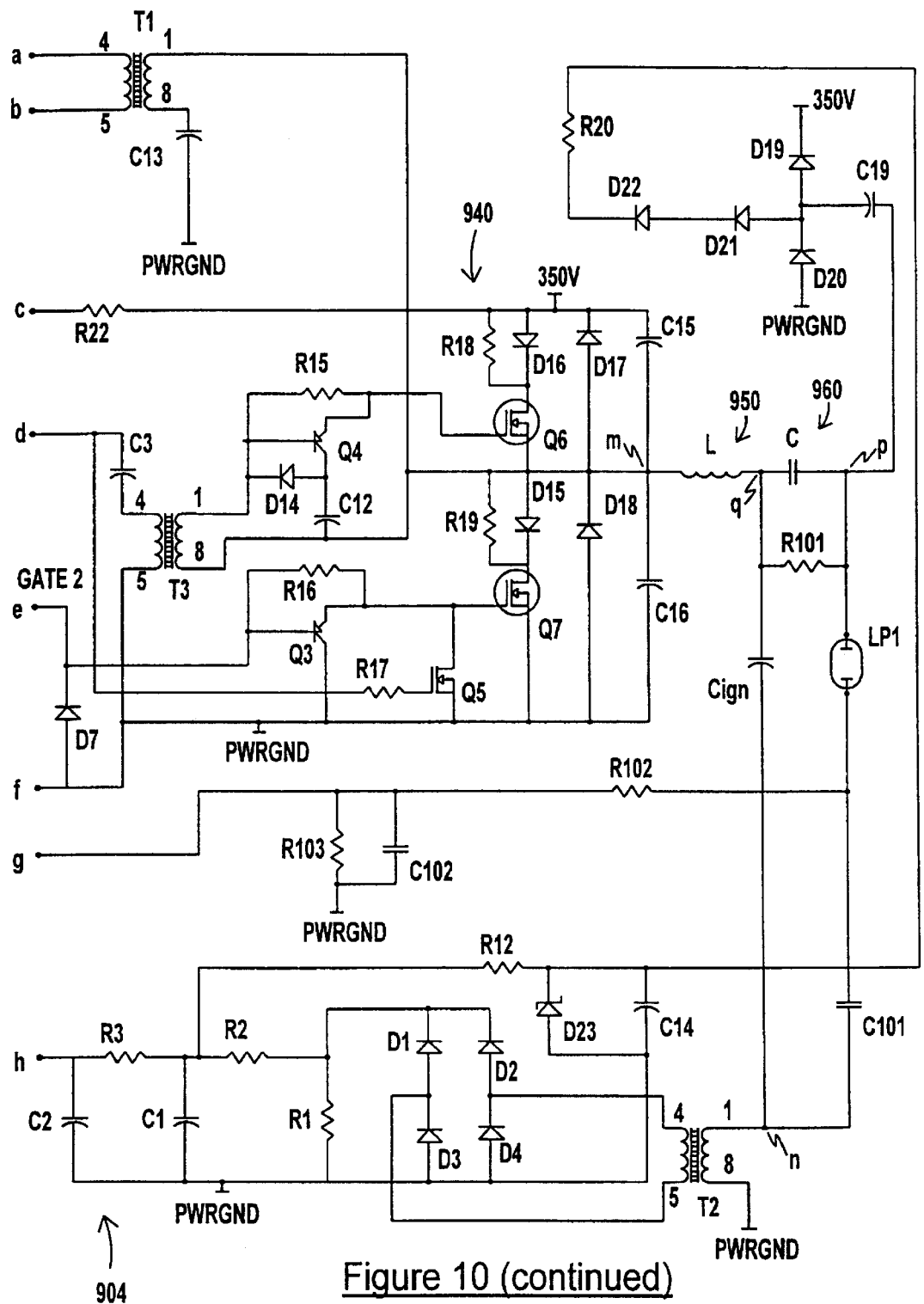

All resistors 1%
All capacitors 5% voltage rating 25 vdc rating except as stated FIG. 10 shows a lighting system 901 comprising a control 902 having a power supply input 904 at A and A, which is shown as either 230 V ac or 110 V ac (volts alternating current).

Components SR1, C22, L1, & C23 form a filter network that prevents high frequency interference currents generated by the circuit travelling back into the power line. BR1 is a full wave bridge rectifier and C20 and C21 are energy storing smoothing components.

Rectified and smoothed line power is thus available at a voltage typically of 350 volts dc between the point marked 350 V and the ground marked PWRGND. This is the primary source of power for the embodiment to be described and will, for simplicity, be referred to as the 350-volt rail.

This method of obtaining direct current from the power line is known to draw undesirable harmonic currents from the power line. The circuit stages involved namely BR1, a full wave bridge rectifier, and C20 and C22 the energy storing smoothing components may be replaced by an "Active Power Factor Correction" circuit in order to overcome the above mentioned disadvantage. Such Active Power Factor Correction circuits are well known and documented in the art and may be employed without detriment to the function of the invention. One property of such active power factor correction circuits is that the output voltage is regulated independent of the line voltage and may be chosen at any convenient value above the peak line voltage, for example 420 V dc is a commonly employed value. A benefit of such an increase in the supply voltage to the control circuit is improved lamp ignition.

The 350 volt dc rail is connected and provides power to the alternating current power regulator 940 comprising a zero voltage switching half bridge inverter circuit comprising Q6, Q7, D15, D16, D17, D18, C15 & C16. This inverter circuit supplies high frequency ac power to the lamp through L, C and C101. An ignition capacitor Cign is provided to form a resonant circuit with inductor L.

The operation of the half bridge inverter circuit will now be described with reference to FIG. 10.

Transformer T3 in the circuit diagram performs the level shifting required to operate the gate of the "high side transistor Q6. Components Q4, R15, D14 and C12 enhance the gate discharge current available to Q6, whilst Q3, R16, R17 & Q5 enhance the gate discharge current available to Q7.

The driving waveforms thus made available to the power switching elements Q6 & Q7 are arranged so as to be in anti-phase thus Q6 is driven on whilst Q7 is biased off and vice-versa. Moreover the drive waveform provides for a dead space i.e. a small period of time between the commutation of the conduction period of one transistor and the onset of conduction of the other transistor.

Figure 7:
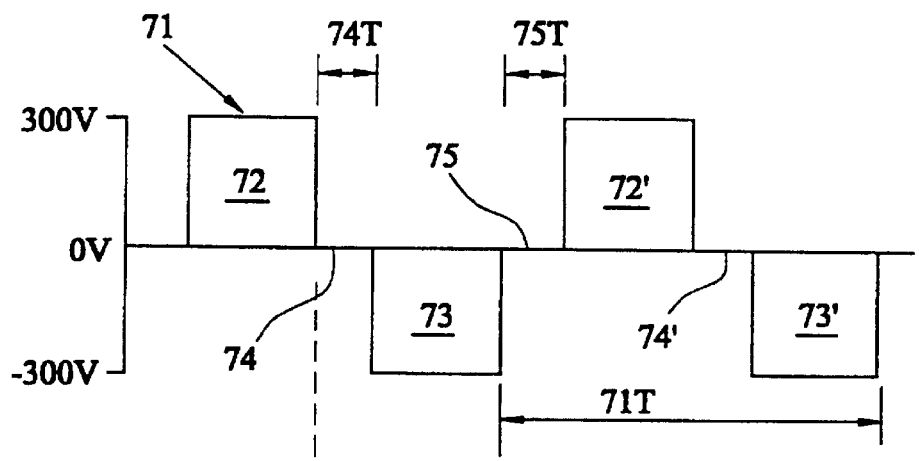
FIG. 7 is a graph of a driving waveform for the output transistors for the embodiment shown in FIG. 10.

From FIG. 7, a graph of such a driving waveform for the output transistors, the power switching elements Q6 and Q7, for the embodiment shown in FIG. 10 may be seen with the voltage on the vertical axis and time on the horizontal axis. The driving waveform 71 comprises a square wave positive pulse 72 and a negative pulse 73, separated by a zero voltage dead space 74, the negative pulse followed by a second dead space 75. This is then repeated at a time interval of 71T such that the frequency of the waveform is greater than 400 kHz. The dead spaces have a time interval of 74T and 75T respectively, and preferably this time interval is such that the output transistors have sufficient time to cease conducting, and also that the energy stored in the reactance of the output circuit is sufficient to reverse the potential of the output side of the output transistors so that they do not have to switch any voltage.

In the embodiment of FIG. 10, 300 nS has been found to be an acceptable time interval for the dead spaces 74T and 75T with a whole cycle time interval 71T of 2 $\mu$S at 500 kHz.

Figure 8:
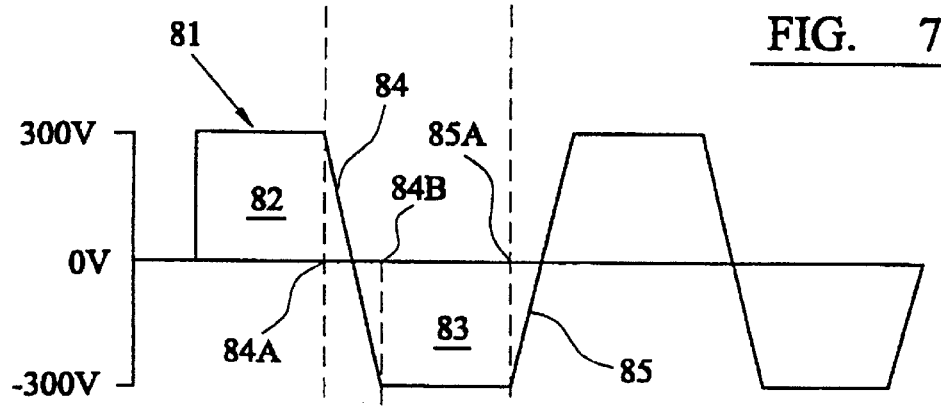
FIG. 8 shows an output waveform of the power output to the lamp in FIG. 10 at a preferred operating condition.

FIG. 8 shows an output waveform 81 of the power output to the lamp LP1 of FIG. 10 at a preferred operating condition. The preferred operating condition is such that when the first output transistor ceases to be driven at 84A, the stored energy in the output reactance L and C of FIG. 10 is sufficient to produce the voltage change shown by line 84, such that at time 84B the voltage has reversed completely and the second transistor begins to conduct to maintain the negative pulse until time 85A when the reactance again drives the voltage up line 85.

Figure 8A:
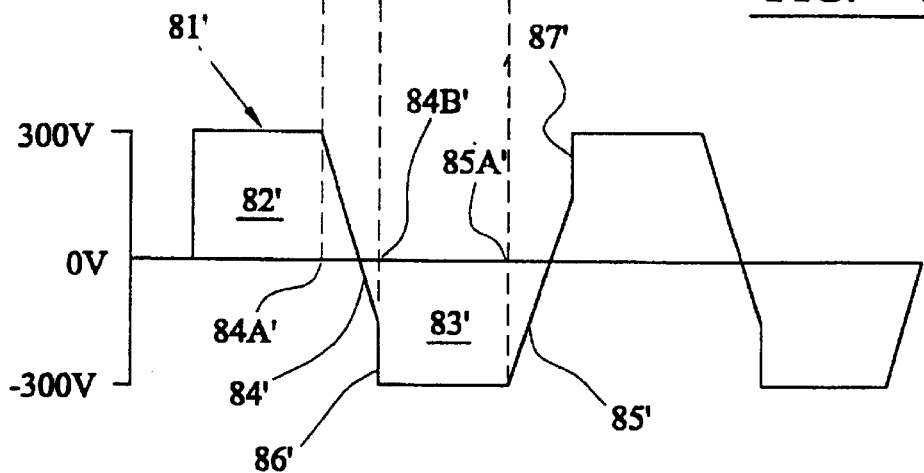
FIG. 8A shows an output waveform similar to FIG. 8, but at a non-preferred operating condition and resulting from the driving waveform of FIG. 7.

FIG. 8A shows an output waveform 81' similar to FIG. 8, but at a non-preferred operating condition and resulting from the driving waveform of FIG. 7. The non-preferred operating condition is such that when the first output transistor ceases to be driven at 84A', the stored energy in the output reactance L and C of FIG. 10 is insufficient to produce the preferred voltage change, and can only produce the voltage change shown by line 84', such that at time 84B' the voltage has not reversed completely and when the second transistor begins to conduct to maintain the negative pulse it has to increase the output potential by a step change 86', when it maintain the voltage until time 85A' when the reactance again drives the voltage up line 85'. Again this is insufficient to completely reverse the voltage and the first transistor has to increase the output voltage by a step change 87'. These step changes in voltage are undesirable.

Figure 9A:
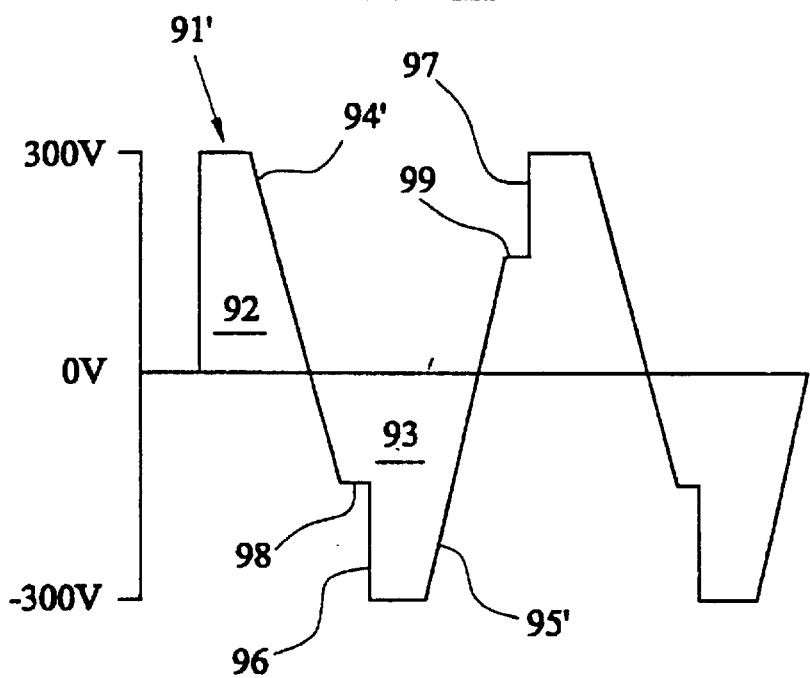
FIG. 9A is a graph of an output waveform resulting from the driving waveform of FIG. 9.

FIG. 9 is a graph of a driving waveform 91 for the output transistors for the embodiment shown in FIG. 10 at a higher frequency and show how the dead space time intervals 94 and 95 must remain the same at 300 nS to allow the transistors to switch completely. However, from FIG. 9A which is a graph of an output waveform 91' resulting from the driving waveform 91 of FIG. 9, it maybe seen that due to the increased frequency there is no longer sufficient energy in the output pulses 92 and 93 to enable the output reactance to store sufficient energy to completely reverse the voltage. Hence the voltage change 94' reaches a steady state voltage at 98 before the output transistor is driven, and hence the output transistor has to increase the output voltage by step change 96. Similarly in the second half of the cycle, the voltage change 95' reaches a steady state voltage at 99 before the output transistor is driven, and hence the output transistor has to increase the output voltage by step change 97.

This dead space serves two functions, the first is to ensure that Q6 & Q7 cannot conduct simultaneously and the second is to provide a time interval for the resonant transition of current from one transistor to the other.

This resonant transition of current may provide considerable benefit to the electrical efficiency of the circuit, since by this means the considerable switching losses that normally occur in such a circuit are avoided altogether.

The operation of this feature will now be described by comparison with a circuit that does not support resonant transition switching.

In a conventional inverter the power switching elements are not equipped with parallel capacitors C15 & C16. When one or other device commutates current, such current continues to flow in the device for a period of time known as the "fall time". During such fall time the device supports simultaneously a high current and voltage which leads to high power dissipation during the commutation event. When the commutation events occur at high frequencies, such as is the case in the present invention, considerable power is lost. This loss is commonly referred to as switching loss.

The introduction of C15 & C16 into the circuit can under certain operating conditions, completely eliminate this switching loss. The important conditions are:
1. That a dead space is provided by the driving circuit waveforms.
2. That the load driven by the inverter is inductive in nature and is of a certain minimum current.

Preferably the operating frequency range is constrained to ensure that the operating frequency lies above the resonant frequency of L and C so that the inverter always drives an inductive load during lamp operation. The above conditions are therefore met in this embodiment of the present invention.

In the resonant transition variant of the half bridge inverter capacitors C15 & C16 provide an alternative pathway for the inductive current normally commutated by the power switching elements. When for example the driving waveform for the gate of Q7 goes to the low state Q7 ceases to conduct. Current continues to flow through the inductor L however, so that the current, which was flowing in Q7 now commutates without loss into the capacitor C16. The direction of current flow is such as to charge C16 resonantly towards the upper 350-volt supply rail.

Sufficient time must be allowed in the dead space for this charging process to occur. The components C5 & R4 set the dead space period by way of a monostable function internal to the control IC The energy required to charge C16 in this manner is derived from energy stored in inductor L. However inductor L stores more energy than is required to charge C16 to a voltage equal to the upper supply rail.

This additional energy is returned to the supply rail via D17. D17 is in anti-parallel to Q6 and serves in conjunction with D16 to prevent the flow of current in the "body Diode" of Q6.

Exactly the same process occurs when Q6 commutates current into C15 during the opposite half cycle of inverter operation.

The body diodes of power mosfet transistors have long reverse recovery times that lead to poor high frequency performance and device failure if the inverter circuit feeds capacitive loads. If the load is capacitive, for any reason, then the body diode of one device can be conducting when the opposite device is turned on. This event causes very high currents to flow in both devices for the duration of the body diode reverse recovery period.

Although operation of the inverter is always into an inductive load, if the lamp is running, capacitive loads can be present during lamp ignition so that D15, D16, D17 & D18 are provided to eliminate the possibility of catastrophic transistor failures during lamp ignition.

Driving waveforms for the two inverter transistors Q6 & Q7 are preferably derived from a control IC available on the market, and manufactured by Unitrode Inc. of USA Type UC3861'.

This IC performs a number of functions useful to the invention, although these functions may equally well be obtained from an alternative suitable circuit arrangement. The IC may be made sensitive to the prevailing lamp and supply conditions and can therefore be used to control the half bridge inverter circuit so as to start a lamp, limit the range of operating frequencies, and to regulate the power of a running lamp. The manner in which one embodiment of the invention utilises the control IC will now be described with reference to FIG. 10.

Operating power for the control IC, U1, is derived from two sources, one source is utilised during circuit start up and relies upon a particular characteristic of the control IC. The other source is used to supply power to the IC in steady state operation with a running lamp. In this way a useful mode of lamp ignition is ultimately obtained.

The IC characteristic mentioned above is known as Under Voltage Lock Out (UVLO) which prevents operation of the IC when the supply voltage to the IC is too low for proper operation. When the IC is in the under voltage condition it is said to be below the UVLO start threshold. In this mode The IC draws a very low current from its supply.

Accordingly a high value of resistance from the 350-volt rail (R22 in FIG. 10) will supply sufficient current to charge C24 to the upper UVLO threshold. (C24 is connected across the supply pins of the control IC). Once the upper UVLO threshold of the control IC has been reached the IC will become operational and draw a high current from the capacitor C24.

This capacitor is sized such that sufficient energy is stored in it to allow operation of the IC for some 20 ms. During this period of operation the outputs of the IC will become active and drive the gates of the inverter transistors Q6 & Q7. Once the inverter has become active a small auxiliary transformer T1 has its primary energised via a coupling capacitor C13. This transformer T1 has a 10:1 reduction ratio and its secondary is full wave rectified by D9, D10, D11, & D12. The rectified output is applied across C24 so as to maintain a continuous supply of power to the control IC.

At the moment of power up the 5-volt reference pin of the IC becomes active and rapidly transitions between 0 and 5 v. This transition is capacitively coupled to the base of emitter follower Q2 via C10 so that the emitter of Q2 moves to an initial voltage of approximately 4.3 volts. As C10 charges the emitter voltage of Q2 falls towards 0 volts. The time constant of this circuit is set by R10. D8 ensures that C10 is immediately discharged if the 5 volt output of the control IC falls to zero. D8 thus provides a means of resetting C10.

The action of this part of the circuit is such as to force the voltage-controlled oscillator (VCO) internal to the IC to run at its maximum programmed frequency on power up. As C10 charges and the voltage on the emitter of Q2 falls the VCO frequency falls towards the minimum programmed frequency. C8, R8 & R9 conveniently program the maximum and minimum frequencies of the VCO.

The output of the VCO is internally divided by two and used as a clock for the IC outputs, so the overall effect of this sub-circuit is to cause the inverter output to sweep between a maximum and a minimum frequency at power up. The rate of this sweep is defined ultimately by the time constant of C10 and R10.

During this power-up frequency sweep at a particular frequency PF a series resonance of L and Cign will be excited, producing a burst of high voltage at the particular frequency PF across the lamp terminals, thereby breaking the lamp down into the glow mode of operation. The output frequency of the inverter will continue to fall rapidly to the minimum programmed frequency. This will minimise the reactance in series with the lamp thereby maximising lamp current, so as to ensure a rapid glow to arc transition.

Should the lamp fail to light, a time-out circuit comprising C7 & R6 will cause the control IC to shut down its outputs thus inhibiting the inverter activity. The time constant of C7 & R6 is preferably made small so as to limit operation of the inverter to a short period of time in this "ignition" mode. Preferably the short period of time is less than 10 seconds, and more preferably less than 500 milli-seconds, and still more preferably to less than 100 ms.

This short period of time minimises the exposure of the inverter transistors to the high dissipation conditions that exist if the inverter is allowed to run continuously without a lamp load. Under these conditions the inverter would be driving a capacitive load with consequent high switching losses.

As soon as the action of the time out circuit has inhibited inverter operation the auxiliary transformer T1 is deprived of power, so that this source of supply power to the control IC is removed. The current flowing through R22 alone cannot sustain operation of the IC, so that capacitor C24 becomes discharged. Once the voltage on C24 falls below the lower UVLO threshold the IC will revert to its low power mode and the charge cycle of C24 begins once more, leading to another power up ignition sequence. This process will continue until the lamp eventually lights, or mains power is removed from the ballast.

This process provides an automatic means of lighting a lamp which has become too hot to start as a result of a previous period of normal operation, without wasting power in the ballast. Hot lamps have increased lamp fill pressures, which can elevate the voltages required for lamp ignition to undesirably high levels.

If the attempt to light the lamp was successful, lamp current flowing through the primary of the lamp current sense transformer T2 causes a scalar current to flow in the secondary of T2. This secondary current is full wave rectified by D1, D2, D3 & D4. This rectified current produces a voltage drop across R1, the current sense resistor. This voltage is proportional, therefore, to the lamp current. Once the lamp has entered a conductive phase, direct current derived from the 500 kHz square wave output at m passes through L, and although blocked by C, is able to pass through shunting resistor R101 and hence through the lit lamp to charge C101. The output of the inverter at the junction m between the source of Q6 and the anode of D15 has a DC component of voltage that is equal to half the supply voltage to the inverter, which in this embodiment is 350 V. Hence, the voltage developed on C101 is passed via R102 and charges C102. Thus a lit lamp results in a DC voltage being developed across C102. The DC voltage so developed passes current through R7 into the base of Q1 so that the time out circuit of C7 & R6 is defeated by the action of Q1 and continuous operation of the circuit is allowed.

Note that capacitor C102 filters out the AC component of voltage passed by R102.

Once continuous operation has become established the function of the control IC becomes that of regulating lamp current and power.

In order to regulate lamp power both lamp current and lamp voltage must be sensed. Lamp current sensing is by way of the current sense transformer T2 and the above mentioned current sense resistor.

Averaging components R2, C1, R3 and C2 present a signal (I lamp average) to the control IC which is proportional to the lamp current. An operational amplifier internal to the control IC compares this signal with a set point established by R13 & R14. In this way the lamp current signal causes the frequency of the VCO to be increased or decreased in order to maintain the set point current. Components C11 & R11 are used to tailor the frequency response of the operational amplifier so as to maintain loop stability under all operating conditions.

Holding lamp current constant in this way would take no account of the lamp power variations caused by lamp voltage changes. Lamp power would be proportional to lamp voltage. Accordingly the lamp voltage is sensed and averaged by components C19, D21, D22, R20, C14, & D23. Components D19 & D20 limit the lamp voltages sensed, so as to prevent false operation during lamp ignition.

The signal thus derived is proportional to lamp voltage and is resistively summed with the average lamp current signal presented to the control IC via R12. In this way the actual lamp current set point is reduced according to increased lamp voltage, so as to obtain constant lamp power operation over the anticipated range of lamp voltages. This method is well known in the art and is referred to as "linear Interpolation".

Over the normal range of lamp voltages, lamp power will be held substantially constant by the use of this control method. If however the lamp voltage falls outside of the normal range, lamp power will deviate significantly from the nominal value. In a preferred embodiment of the invention, the lamp voltage and current signals are summed in such a way as to reduce lamp power if the lamp voltage falls outside of the normal operating range.

Hence before the lamp is lit there is no DC current able to flow through the lamp, and when the lamp is lit there is a finite DC current that is able to flow through the lamp. Although it is desirable, in order to obtain long lamp life, to minimise the DC through a lamp, a low DC current causes the charging time for the capacitor C101 or M4 to be relatively long. A further benefit of a low DC current is that a shock hazard that would be present with a higher current at the terminals F4 and S4, and F5 and S5, across the lamp holder terminals is avoided.

At high output frequencies, the value of the capacitor necessary to ensure correct operation of the lamp is small. Hence in an embodiment of the invention, such as that shown in FIG. 10, when a lamp fails to light, this may be detected within 20 ms, and the control shut down by the action the voltage on "g" on Q1. This prevents excessive heat dissipation in the switching elements Q6 and Q7, avoiding causing premature failure of the control.

To ensure reliable detection of the condition when the lamp is lit, the voltage detected across the capacitor C101 or M4, it is necessary to average the voltage using the RC integrating circuit of R103 and C102. A disadvantage of this arrangement is that the operation of this circuit adds further delay in the detection of the lamp lit condition. However, the use of a high output frequencies enables the use of small values of capacitance in the averaging circuit without compromising the ability of this circuit to reject electrical noise.

What is claimed is:

1. A control (1, 2) and a discharge lamp (D1', D2'), the control arranged for connection to a source of alternating current electrical power (L1', N1', L2, N2) at a source frequency, the source frequency being a low frequency, the control having a first and a second terminal (F1, S1, F2, S2) for supplying an output of electrical power to operate the discharge lamp (D1', D2'), the output power being at a high frequency, and a first capacitor (T2') being connected in series with the lamp to the first terminal (F1, F2), the first capacitor having a value of capacitance, characterised in that the value of capacitance is sufficiently small to limit a current flow from the first terminal at the source frequency to less than 30 mA, and wherein a second capacitor (M2) is connected in series with the lamp to the second terminal (F2), the second capacitor having a value of capacitance, the value of capacitance being sufficiently small to limit a current flow from the second terminal at the source frequency to less than 30 mA.

2. A control and a discharge lamp as claimed in claim 1, wherein the current flow at the source frequency is limited to less than 5 mA.

3. A control and a discharge lamp as claimed in claim 1, wherein the current flow at the source frequency is limited to less than 1 mA.

4. A control and a discharge lamp as claimed in claim 1, wherein the first capacitor is in parallel with an impedance, the impedance having a value such that the combined current at the source frequency through the first capacitor and the impedance is less than 30 mA.

5. A control and a discharge lamp as claimed in claim 4, wherein the current flow at the source frequency is limited to less than 5 mA.

6. A control and a discharge lamp as claimed in claim 4, wherein the current flow at the source frequency is limited to less than 1 mA.

7. A control and a discharge lamp as claimed in claim 1, wherein the output of electrical power is an alternating current supply of a frequency greater than 100 kHz.

8. A control and a discharge lamp as claimed in claim 1, wherein the output of electrical power is an alternating current supply of a sinusoidal wave form.

9. A control and a discharge lamp as claimed in claim 1, wherein the control is arranged to apply a direct current voltage to a first lamp terminal for connection to the lamp, the control further comprising a sensor (P4) to detect the conduction of the direct current voltage by the lamp, the sensor being arranged to provide a feedback signal to the control when the direct current voltage is detected.

10. A control and a discharge lamp as claimed in claim 9 wherein the sensor detects the conduction of the direct current voltage by the lamp, by detecting a direct current voltage level across a capacitor connected to the second lamp terminal.

11. A control and a discharge lamp as claimed in claim 9 wherein the sensor is connected in series with the lamp to detect the current arising from the conduction of the direct current voltage by the lamp.

12. A control and a discharge lamp as claimed in claim 1, wherein the sensor is connected to a second lamp terminal.

13. A control and a discharge lamp as claimed in claim 1, wherein the sensor detects the conduction of the direct current voltage by the lamp before an arc is established in the lamp.

14. A control and a discharge lamp as claimed in claim 9 wherein the control is arranged to provide an alternating current output with a frequency greater than 500 kHz to power the lamp.

15. A control and a discharge lamp as claimed in claim 1, the control is further arranged to apply a direct current voltage to the first terminal (F4), the direct current voltage being supplied through a resistor (R4') connected in parallel with the first capacitor (T4), the control further comprising a sensor (P4) to detect the conduction of the direct current voltage by the lamp, the sensor being arranged to provide a feedback signal to the control when the direct current voltage is detected.

16. A control and a discharge lamp as claimed in claim 15 wherein the sensor detects the conduction of the direct current voltage by the lamp, by detecting a direct current voltage level across a second capacitor (M4) connected in series with the lamp to the second terminal (K4).

17. A control and a discharge lamp as claimed in claim 15 wherein the sensor (P5) is connected in series with the lamp to detect the current arising from the conduction of the direct current voltage by the lamp.

18. A control and a discharge lamp as claimed claim 1, wherein the sensor is connected to a second lamp terminal.

19. A control and a discharge lamp as claimed in claim 1, wherein the sensor detects the conduction of the direct current voltage by the lamp before an arc is established in the lamp.

20. A control and a discharge lamp as claimed in claim 15 wherein the control is arranged to provide an alternating current output with a frequency greater than 500 kHz to power the lamp.

21. A control and a discharge lamp as claimed in claim 1, wherein the resistor is arranged such that a root mean square DC current at the first lamp terminal is less than 30 mA.

22. A control and a discharge lamp as claimed claim 1, wherein each of the capacitors have a value of capacitance, the value of capacitance being sufficiently small to limit a current flow from the either terminal at the source frequency to less than 30 mA.

* * * * *